(12) United States Patent
Iwanaga et al.

(10) Patent No.: US 9,536,558 B2
(45) Date of Patent: Jan. 3, 2017

(54) ERASING RECORDED DATA BY UTILIZING READ HEAD AND WRITE HEAD

(71) Applicant: International Business Machines Corporation, Armonk, NY (US)

(72) Inventors: Masayuki Iwanaga, Urayasu-si (JP); Yumiko Ohta, Yokohama (JP); Yutaka Oishi, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/065,923

(22) Filed: Mar. 10, 2016

(65) Prior Publication Data

US 2016/0189744 A1 Jun. 30, 2016

Related U.S. Application Data

(63) Continuation of application No. 14/719,361, filed on May 22, 2015, now Pat. No. 9,330,708.

(30) Foreign Application Priority Data

Jun. 24, 2014 (JP) .................................. 2014129079

(51) Int. Cl.
*G11B 5/09* (2006.01)
*G11B 20/10* (2006.01)
(Continued)

(52) U.S. Cl.
CPC .......... *G11B 20/10* (2013.01); *G11B 5/00813* (2013.01); *G11B 5/00821* (2013.01); *G11B 5/024* (2013.01);
(Continued)

(58) Field of Classification Search
None
See application file for complete search history.

(56) References Cited

U.S. PATENT DOCUMENTS

| 5,408,366 A | * | 4/1995 | Bentley | G11B 15/04 360/53 |
| 6,542,321 B1 | * | 4/2003 | Molstad | G11B 5/00813 360/25 |
| 2003/0026020 A1 | * | 2/2003 | Buckingham | G11B 27/3027 360/48 |

(Continued)

FOREIGN PATENT DOCUMENTS

| JP | 06139650 A | 5/1994 |
| JP | 2012181896 A | 9/2012 |

(Continued)

OTHER PUBLICATIONS

Japan Patent No. 2014129079 entitled "Method for Reducing Time Required for Erasing Recorded Data by Utilizing Read Head and Write Head", filed Jun. 24, 2014.

(Continued)

*Primary Examiner* — Tan X Dinh
(74) *Attorney, Agent, or Firm* — James H. Mayfield; David B. Woycechowsky

(57) ABSTRACT

Techniques for reducing the time required for erasing specific data recorded on a tape medium. A specific group of records is erased without preliminarily locating the erasure end position. This is carried out by simultaneously utilizing three heads, that is, two read heads and one write head, to detect the erasure end position during data erasure. Various embodiments are applicable to tape media as well as other storage media. Various embodiments are not only applicable as a file system cooperating as a combination of hardware (H/W) and software (S/W), but also applicable in systems, such as databases, that directly use storage without an intermediary file system.

8 Claims, 5 Drawing Sheets

(51) Int. Cl.
    *G11B 15/04*     (2006.01)
    *G11B 20/18*     (2006.01)
    *G11B 5/008*     (2006.01)
    *G11B 5/584*     (2006.01)
    *G11B 5/024*     (2006.01)
    *G11B 20/12*     (2006.01)
    *G11B 27/36*     (2006.01)
    *G11B 5/55*     (2006.01)

(52) U.S. Cl.
    CPC ............... *G11B 5/584* (2013.01); *G11B 15/04* (2013.01); *G11B 20/1879* (2013.01); *G11B 5/5508* (2013.01); *G11B 27/36* (2013.01); *G11B 2020/10851* (2013.01); *G11B 2020/10898* (2013.01); *G11B 2020/1267* (2013.01)

(56) References Cited

U.S. PATENT DOCUMENTS

| | | | | |
|---|---|---|---|---|
| 2003/0026025 A1* | 2/2003 | Maple | .................... | G11B 20/10 360/53 |
| 2003/0030932 A1* | 2/2003 | Sved | ................ | G11B 5/00813 360/53 |
| 2004/0168024 A1* | 8/2004 | Buckingham | .......... | G11B 20/12 711/111 |
| 2007/0285838 A1* | 12/2007 | Hennecken | ........ | G11B 5/00878 360/129 |
| 2014/0016221 A1* | 1/2014 | Buch | ...................... | G11B 5/012 360/46 |
| 2014/0016222 A1* | 1/2014 | Ionescu | .................... | G11B 5/09 360/46 |
| 2014/0016226 A1* | 1/2014 | Bui | ........................ | G11B 5/584 360/76 |
| 2015/0248248 A1* | 9/2015 | Trezise | ................ | G11B 23/049 711/103 |
| 2015/0371674 A1* | 12/2015 | Iwanaga | ................ | G11B 15/04 360/49 |

FOREIGN PATENT DOCUMENTS

| JP | 2013191259 A | 9/2013 |
|---|---|---|
| JP | 2013538399 A | 10/2013 |

OTHER PUBLICATIONS

Appendix P—List of Patents or Patent Applications Treated as Related, Filed Mar. 10, 2016, 2 pages.

* cited by examiner

ERASING RECORDED DATA BY UTILIZING READ HEAD AND WRITE HEAD

BACKGROUND

The present invention relates generally to the field of erasing data on tape using a tape drives, and more particularly to relatively long erasures of taped data made by tape drives.

Some commercial tape drives and/or enterprise tape drives have a function called RWW (Read While Write). The RWW function checks for errors in written data using a read head immediately after the data is written. This is carried out with a structure having a write head that writes data on a tape medium and a read head that reads data written on the tape medium, disposed side by side with each other. If an error is found in this check, proper data is read from a data buffer and rewritten. In general, a write head and a read head are physically distinct from each other, and a tape drive writes data while moving a tape medium back and forth. A head structure supporting RWW typically includes read heads disposed on both sides of a write head.

SUMMARY

According to an aspect of the present invention, there is a method, computer program product and/or system that performs the following operations (not necessarily in the following order): (i) receiving a request to erase a set of record(s) recorded on a storage medium; (ii) identifying a data set (DS) corresponding to the set of record(s) to be erased from the storage medium, with the set of record(s) including a first record and a last record; (iii) reading, by a read head of a storage drive, a data set information table (DSIT) indicating location(s) of each record of the set of record(s) in the data set (DS); (iv) determining whether the data set (DS) includes a beginning of the first record; (v) on condition that the data set (DS) includes the beginning of the first record, starting erasure by a write head of the storage drive; (vi) determining whether the identified data set (DS) includes an end of the last record; and (vii) on condition that the data set (DS) includes the end of the last record, stopping the erasure by the write head of the storage drive after erasing the data set (DS).

According to a further aspect of the present invention, there is a method, computer program product and/or system that performs the following operations (not necessarily in the following order): (i) reading, by a read head of a storage drive, data indicating a range recorded on a storage medium, which range is to be erased, while the storage medium is moving in a first moving direction relative to the storage drive; and (ii) writing new data, by a write head of the storage drive, across the range while the storage medium continues to move in the first moving direction relative to the storage drive.

According to a further aspect of the present invention, a file system includes: (i) a receive module configured to receive a request to erase a set of record(s) recorded on a storage medium; (ii) an identifying module configured to identify a data set (DS) corresponding to the set of record(s) to be erased from the storage medium, with the set of record(s) including a first record and a last record; (iii) a reading module configured to read, by a read head of a storage drive, a data set information table (DSIT) indicating location(s) of each record of the set of record(s) in the data set (DS); (iv) a first determination module configured to determine whether the data set (DS) includes a beginning of the first record; (v) a start-erasure module configured to, on condition that the data set (DS) includes the beginning of the first record, start erasure by a write head of the storage drive; (vi) a second determination module configured to determine whether the identified data set (DS) includes an end of the last record; and (vii) a stop-erasure module configured to, on condition that the data set (DS) includes the end of the last record, stop the erasure by the write head of the storage drive after erasing the data set (DS).

According to a further aspect of the present invention, a storage drive includes: (i) a first read head configured to read from a storage medium; (ii) a write head configured to write on the storage medium immediately after data is read by the first read head from the storage medium; and (iii) a file system. The file system includes: (a) a read module configured to read, by a read head of a storage drive, data indicating a range recorded on a storage medium, which range is to be erased, while the storage medium is moving in a first moving direction relative to the storage drive; and (b) a write module configured to write new data, by a write head of the storage drive, across the range while the storage medium continues to move in the first moving direction relative to the storage drive.

DETAILED DESCRIPTION

Figure 1:
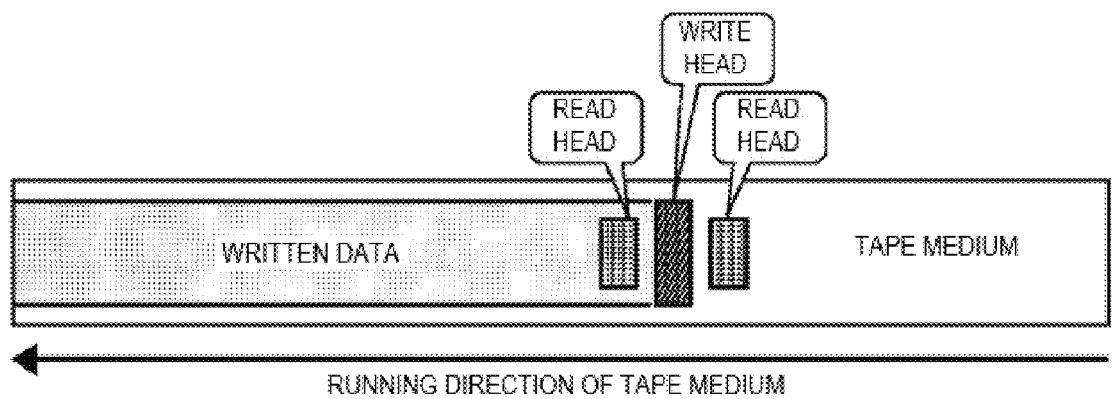
FIG. 1 illustrates the case in which a tape drive has two read heads.
Figure 2:
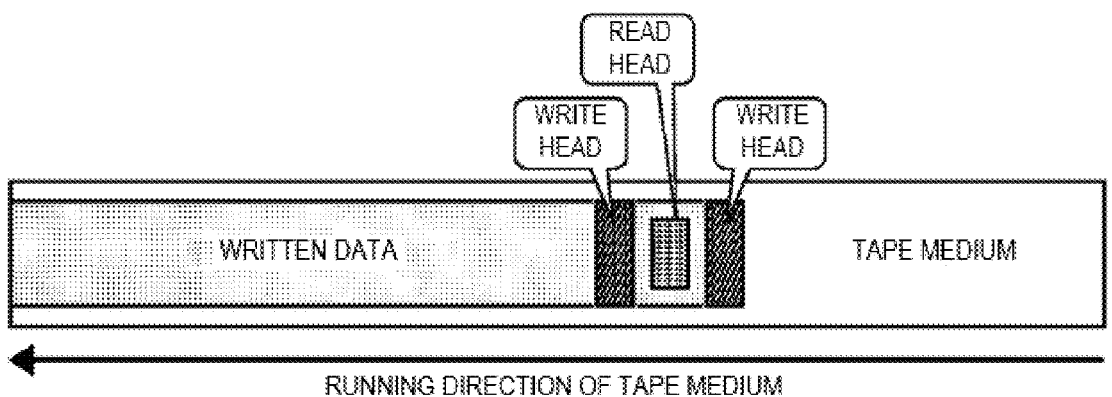
FIG. 2 illustrates the case in which a tape drive has two write heads.

In order to understand various embodiments of the present invention, it is helpful to understand some basic structural features of a typical tape drive, as will now be discussed. FIG. 1 illustrates the case in which a tape drive has two read heads. FIG. 2 illustrates the case in which a tape drive has two write heads.

For data writing in FIG. 1 style tape drive, the RWW function is implemented as follows. When the tape medium runs from right to left, the left-hand-side read head reads data written by the central write head while the right-hand-side read head does nothing. When the medium runs from left to right, the right-hand-side read head reads data written by the central write head while the left read head does nothing.

For data writing in FIG. 2 style tape drive, the RWW function is implemented as follows: (i) when the tape medium runs from right to left, the central read head reads data written by the right-hand-side write head while the left-hand-side write head does nothing; and (ii) when the tape medium runs from left to right, the central read head reads data written by the left-hand-side write head while the right-hand-side write head does nothing.

For either style of tape drive, the three heads do not operate simultaneously in conventional tape drives. When a conventional tape drive writes data on a tape medium, the tape drive reorganizes variable-length data items of about 1 MB each (at most), called "records." These records are sent from a host into fixed-length data items having a capacity of several MB each, called DSs (Data Sets), and the conventional tape drive writes the data on DS-by-DS basis. Each DS has associated metadata called a DSIT (Data Set Information Table), which holds data indicating which records are stored in that DS. The DSIT is stored as part of the DS at a predetermined position in the DS. Conventionally, erasing data recorded on a tape medium (overwriting the data with a special data pattern) typically involves erasing data from a certain position to the end of the tape medium.

However, it is not efficient to spend several hours to overwrite areas in which data to be erased is not written, especially when it is apparent that the data is written only at the beginning of the tape medium. In this respect, some conventional tape drives change the format so that only an intended data portion can be erased. For example, each unit (for example, file, in the case of a tape medium based on LTFS (Linear Tape File System)) of data to be erased may be stored in a different DS. In some conventional tape drives, to erase a certain data portion (that is, records, recorded on a tape medium): (i) the identity of which DSs store the records to be erased are preliminarily located, specifically, the locations on the tape medium the beginning and end of the DS s are recorded are identified; and (ii) the DS s recorded in the identified range are erased. In general, sequentially written multiple records are often collectively erased. The process for collectively erasing sequentially written records will be discussed in the following paragraphs with reference to FIGS. 3, 4 and 5.

STEP 1: The head is positioned at the first record to be erased (see FIG. 3).

STEP 2: The start position of a DS that includes the beginning of the first record to be erased is located (see FIG. 3).

STEP 3: The head is positioned at the last record to be erased (see FIG. 4).

STEP 4: The end position of a DS that includes the end of the last record to be erased is located (see FIG. 4).

STEP 5: The tape medium is rewound to the beginning of the data to be erased (see FIG. 5). The data is erased (for example, by overwriting the data with a high-frequency pattern as in executing a conventional ERASE command) from the start position obtained in Step 2 to the end position obtained in STEP 4 (see FIG. 6).

Figure 3:
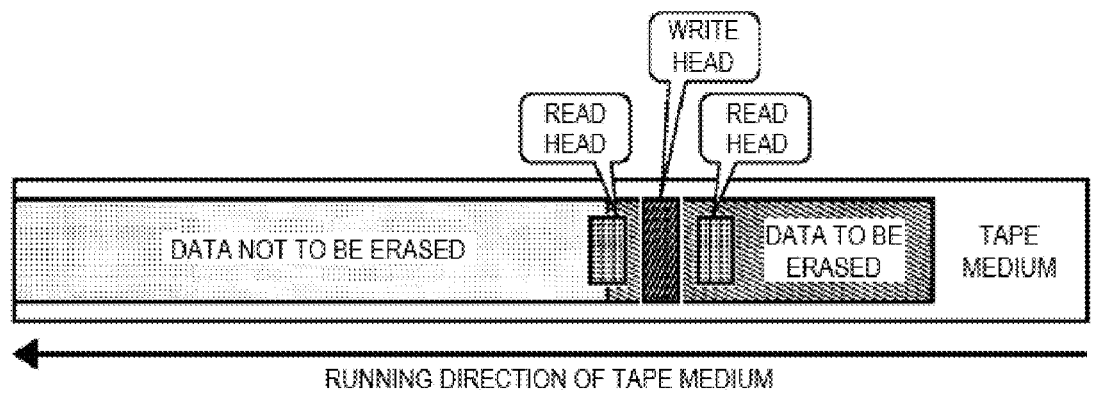
FIG. 3 illustrates the process of collectively erasing sequentially written records.
Figure 4:
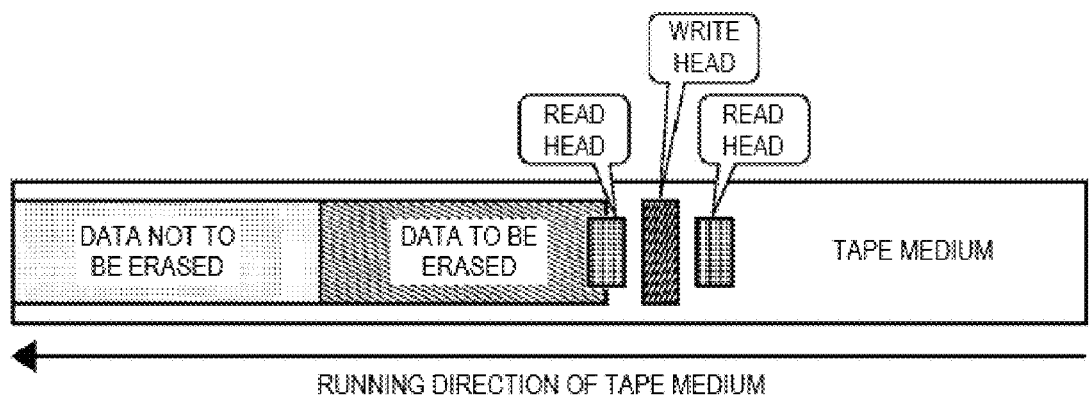
FIG. 4 illustrates the process of collectively erasing sequentially written records.
Figure 5:
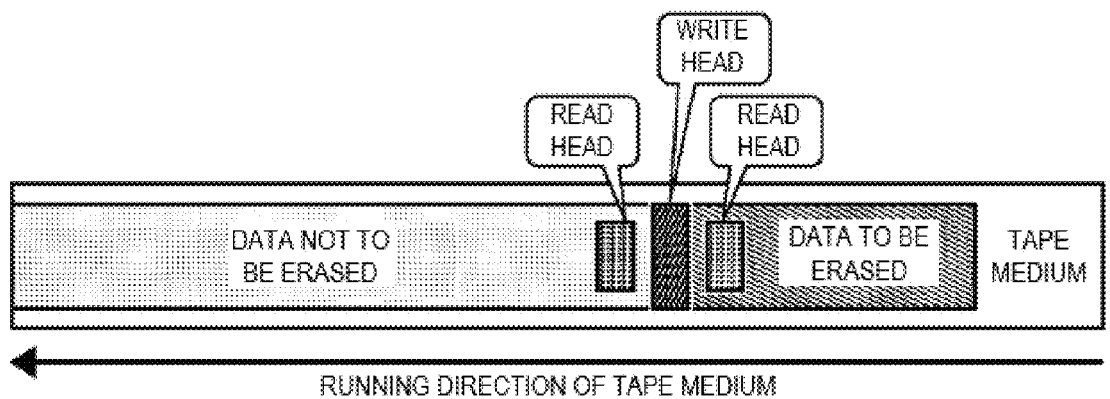
FIG. 5 illustrates the process of collectively erasing sequentially written records.
Figure 6:
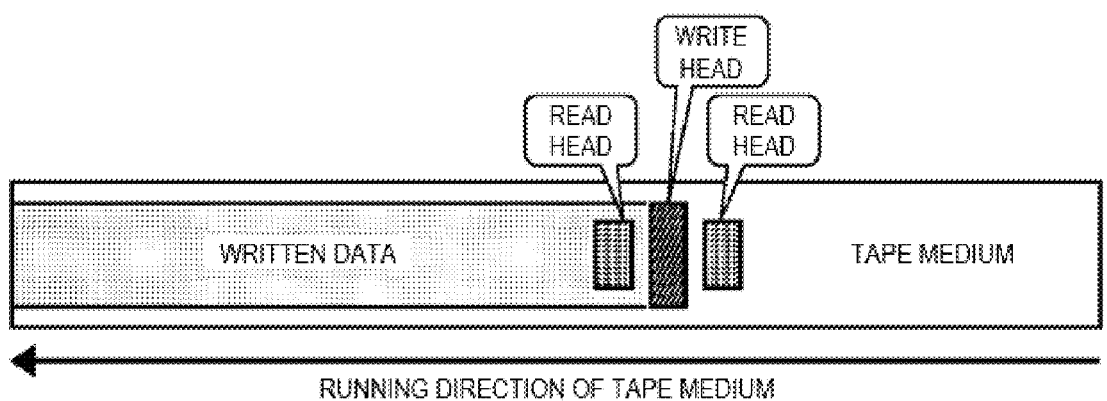
FIG. 6 illustrates the case in which a tape drive has two read heads.

FIG. 6 is similar to FIG. 1, although the "written data" in FIG. 6 is "data written for the purpose of erasure." In FIGS. 3, 4, and 5, data not to be erased is written on the left side of the data to be erased. Similarly, data not to be erased is also typically written on the right side of the data to be erased, but omitted in these figures. In the above process, proceeding from Step 4 to Step 5 requires rewinding the tape medium from the last record to the first record. In conventional tape drive systems, his takes several seconds even for erasure of one record, and one minute or more for erasure of many records.

Some embodiments of the present invention reduce the time required for the positioning described in the foregoing paragraphs because the need for such positioning is eliminated, as will be described in detail, below.

In some embodiments of the present disclosure, records are erased by a write head "immediately after" data is read by a read head, while the moving direction of a tape medium relative to the read head and the write head is fixed. The expression "immediately after" should be interpreted in a broad sense. Some embodiments of the present disclosure may include one, or more, of the following features, characteristics and/or advantages: (i) the tape drive is controlled to erase a specific group of records by detecting the erasure end position during data erasure without preliminarily locating the erasure end position; and/or (ii) reduction of the time required for erasure of specific data recorded on a tape medium; (ii) a specific group of records is erased without preliminarily locating the erasure end position; (iv) simultaneously utilizing three heads, that is, two read heads and one write head, to detect the erasure end position during data erasure; (v) elimination of the need to preliminarily locate the erasure end position in data erasure, resulting in a reduction in the time required for the erasure; (vi) the amount of time to be reduced is proportional to the size (length) of the area that the data to be erased occupies on the tape (this may be several seconds at the minimum, and one minute or more in some embodiments).

Now, an embodiment for implementing the present invention will be described. FIG. 6 illustrates the case in which a tape drive has two read heads. FIG. 6 is similar to FIG. 1, although the "written data" in FIG. 6 is "data written for the purpose of erasure." Some embodiments of the present invention assume the structure with two read heads as in FIG. 6.

In some embodiments of the present disclosure, the write head and the read head (which is behind the write head with respect to the moving direction, such as, for example, the left read head in FIG. 6) behave in a conventional manner during data erasure. The following description therefore focuses on behaviors of the read head that is located in front of the write head with respect to the moving direction of the tape medium (for example, the right-hand-side read head in FIG. 6). In some embodiments of the present disclosure, during data erasure, the read head in front with respect to the moving direction reads a DSIT of each DS recorded on the tape medium. When the end of the last record to be erased is reached, a DS that includes the end of the last record is erased and then the erasure is finished.

Figure 7:
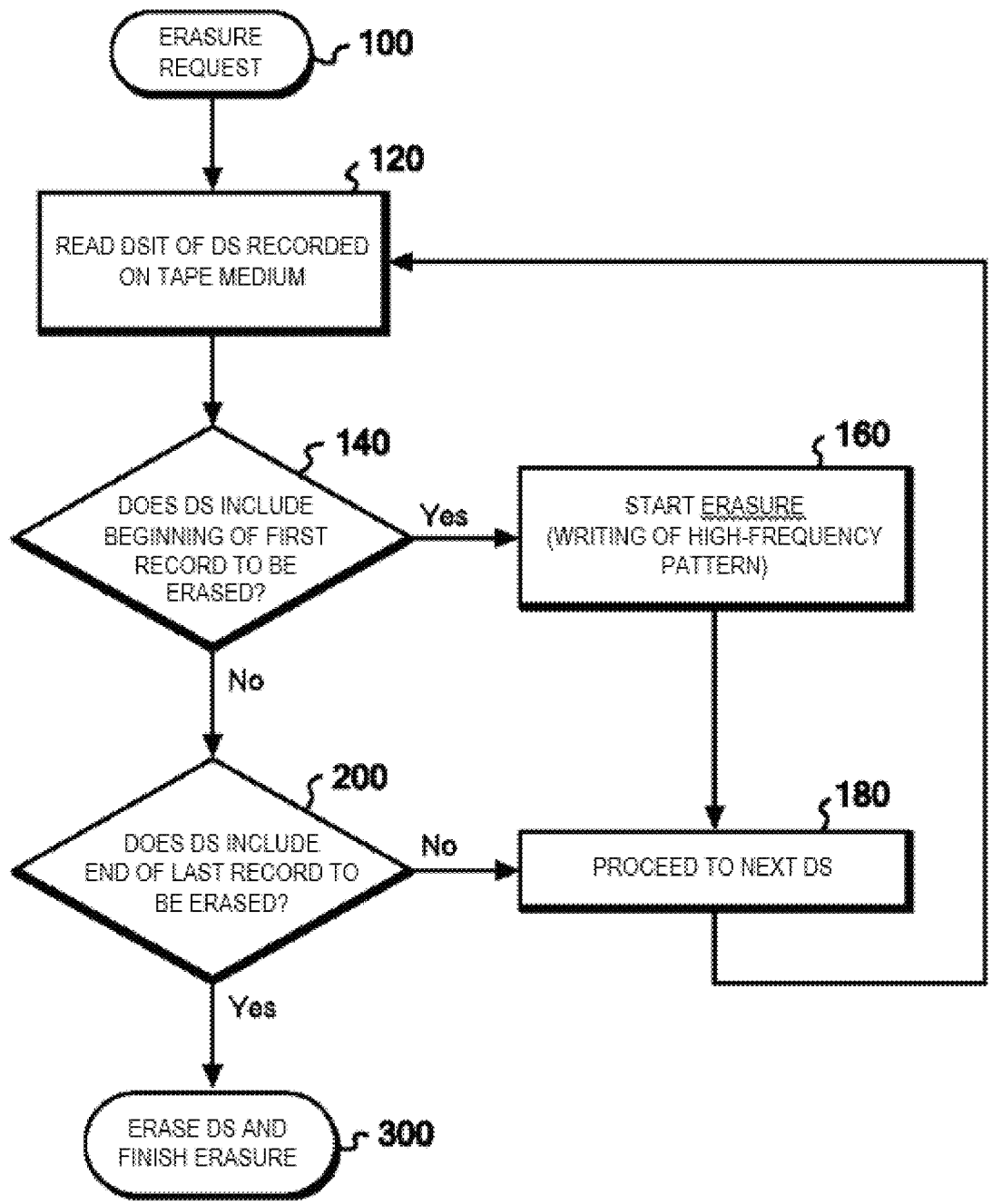
FIG. 7 is a flowchart of behaviors of the read head in front with respect to the moving direction during data erasure.

FIG. 7 is a flowchart of behaviors of the read head in front with respect to the moving direction during data erasure. The method of the flowchart of FIG. 7 includes the following operations (with process flow between and among the operations as shown by arrows in the flowchart of FIG. 7: operation 100; operation 120; operation 140; operation 160; operation 180; operation 200; and operation 300.

Some embodiments of the present disclosure can eliminate the need to preliminarily locate the erasure end position in data erasure, resulting in a reduction in the time required for the erasure. The amount of time to be reduced may be proportional to the size (length) of the area that the data to be erased occupies on the tape, and this may be several seconds at the minimum, and one minute or more.

To enable a host to request data erasure in accordance with the inventive method, new parameters may be added to parameters for an ERASE command, which is one of existing SCSI commands. That is, the record number of a record from which the erasure is started, and the record number of a record at which the erasure is finished, may be added as parameters to allow the start position and the end position to be specified. Alternatively, instead of modifying the parameters for the ERASE command, a MODE SELECT command may be used to allow the host to preregister the erasure start/end record numbers with the tape drive. For the start position, a LOCATE command may be used to position the head at the start position in advance as in a conventional manner.

Figure 8:
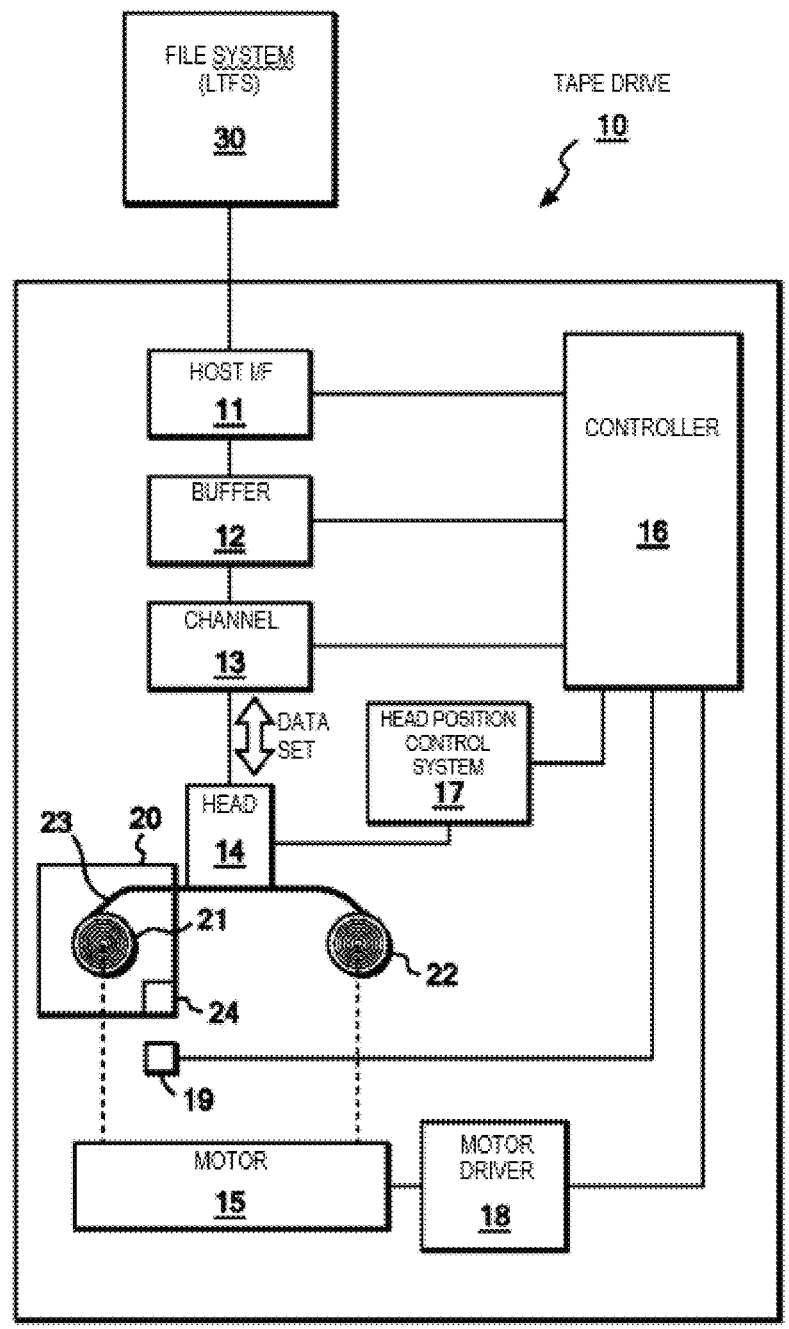
FIG. 8 illustrates a configuration in which a tape is accessible through an interface of a file system.

FIG. 8 shows tape drive 10 which includes: host interface 11; buffer 12; channel module ("mod") 13; head assembly 14; motor assembly 15; controller mod 16; head position control system mod 17; motor driver 18; mod 19; left-hand-side reel assembly 20; left-hand-side reel 21; right-hand-side reel 22; tape section 23; mod 24; and file system (linear tape file system) 30. Tape drive 10 illustrates a configuration in which a tape is accessible through an interface of a file system. It shows an example of typical components of a tape drive 10. The technical concept of the present invention is widely applicable to tape media as well as other storage media. Some embodiments of the present disclosure may be embodied not only as a file system cooperating as a combination of hardware (H/W) and software (S/W), but also as a computer program (S/W) having encoded therein program code that causes the file system to perform the inventive method.

The technical concepts of some embodiments of the present disclosure are also applicable in systems, such as databases, that directly use storage without an intermediary file system, and may be implemented by a computer through various embodiments.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The following paragraphs set forth some definitions for certain words or terms for purposes of understanding and/or interpreting this document.

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

And/or: inclusive or; for example, A, B "and/or" C means that at least one of A or B or C is true and applicable.

Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

What is claimed is:

1. A computer-implemented method comprising:
receiving a request to erase a set of records recorded on a storage medium;
identifying a data set (DS) corresponding to the set of records to be erased from the storage medium, with the set of records including a first record and a last record;
reading, by a read head of a storage drive, a data set information table (DSIT) indicating location(s) of each record of the set of records in the data set (DS), while the storage medium is moving in a first moving direction relative to the storage drive
determining whether the data set (DS) includes a beginning of the first record; and
on condition that the data set (DS) includes the beginning of the first record, writing new data, by a write head of the storage drive, across the range while the storage medium continues to move in the first moving direction relative to the storage drive.

2. The method according to claim 1, wherein:
the storage drive is a tape drive; and
the storage medium is a tape medium.

3. The method according to claim 2, wherein the writing of the new data includes erasing previously written data.

4. A storage drive comprising:
a first read head configured to read from a storage medium;
a write head configured to write on the storage medium immediately after data is read by the first read head from the storage medium; and
a file system comprising:
a receiving module configured to receive a request to erase a set of records recorded on a storage medium,
an identifying module configured to identify a data set (DS) corresponding to the set of records to be erased from the storage medium, with the set of records including a first record and a last record,
a read module configured to read, by a read head of a storage drive, a data set information table (DSIT) indicating location(s) of each record of the set of records in the data set (DS), while the storage medium is moving in a first moving direction relative to the storage drive,
a determining module configured to determine whether the data set (DS) includes a beginning of the first record, and
a write module configured to write new data, on condition that the data set (DS) includes the beginning of the first record, by a write head of the storage drive, across the range while the storage medium continues to move in the first moving direction relative to the storage drive.

5. The storage drive according to claim 4, further comprising a second read head, wherein:
the storage drive is operable in both a first moving direction, such that relative motion between the storage medium and the storage drive is in a first direction, and a second moving direction, such that relative motion between the storage medium and the storage drive is in a second direction;
the first read head is located on a first side of the write head; and
the second read head is located on a second side of the write head.

6. The storage drive of claim 4 wherein:
the storage drive is a tape drive; and
the storage medium is a tape medium.

7. The storage drive of claim 4 wherein the write head is further configured to write the new data in a manner that includes erasing written data.

8. The storage drive of claim 7 wherein write head is further configured erase written data in a manner that includes writing a high-frequency pattern.

* * * * *